Sept. 27, 1932.  J. F. GAIL  1,879,174
MATTRESS FILLER MAKING PROCESS AND MACHINE
Original Filed March 6, 1929
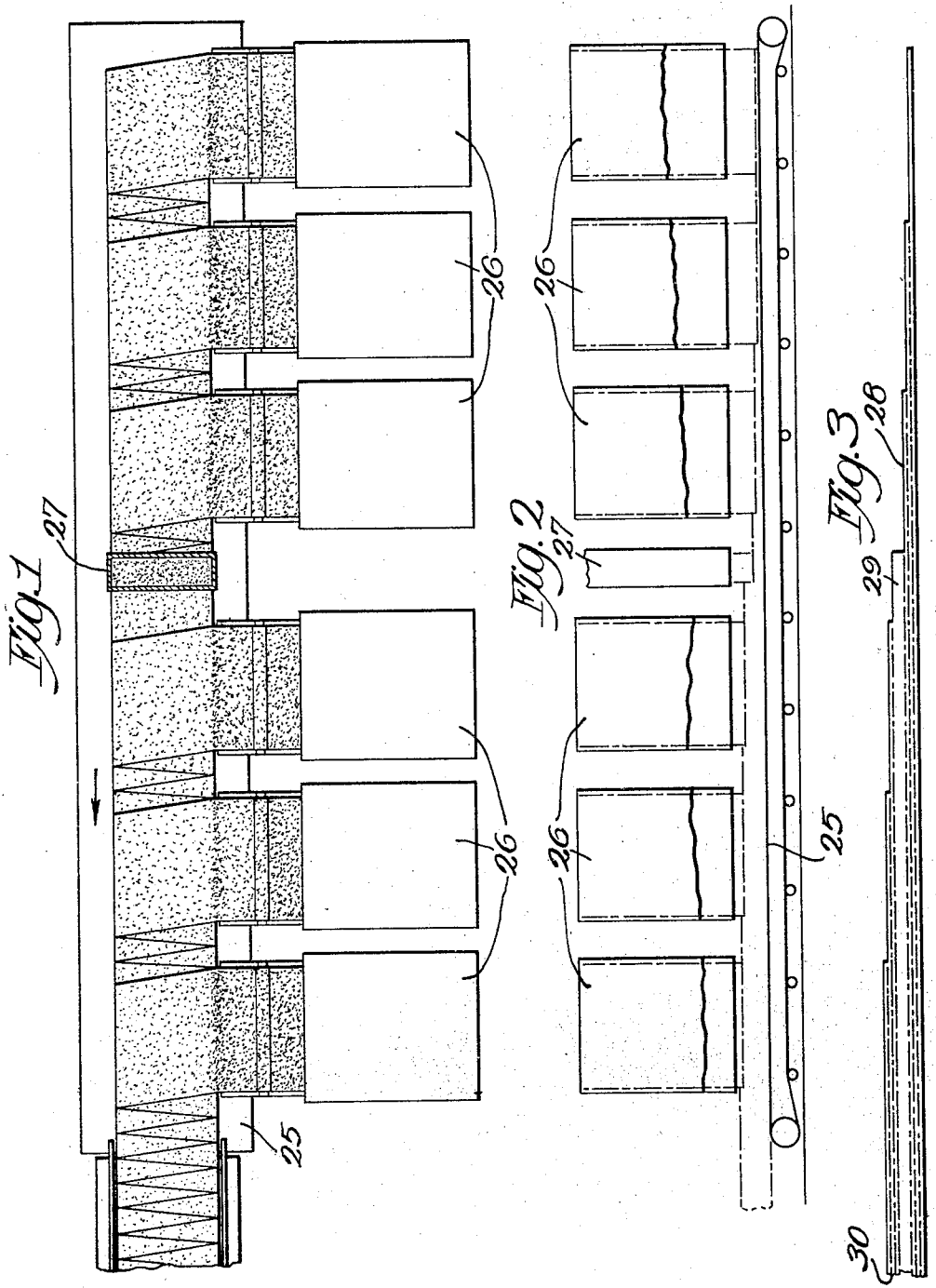
Inventor
John F. Gail
By Fisher, Claff, Soans & Pond Attys Patented Sept. 27, 1932

1,879,174

UNITED STATES PATENT OFFICE

JOHN F. GAIL, OF EVANSTON, ILLINOIS, ASSIGNOR TO SIMMONS COMPANY, OF NEW YORK, N. Y., A CORPORATION OF DELAWARE

MATTRESS FILLER MAKING PROCESS AND MACHINE

Original application filed March 6, 1929, Serial No. 344,698. Divided and this application filed July 9, 1930. Serial No. 466,780.

This application is a division of my copending application Serial No. 344,698, and the invention involved herein relates to a process and machine for making mattresses and more particularly to making mattress fillers.

Objects of the invention are to provide a process and machine for the production of a continuous filler-web of mattress thickness, to produce such a web which is adapted for composite or "plated" mattresses, and to produce such a web by a continuous process.

Other objects and advantages will be understood by reference to the following specification and the accompanying drawing in which I have illustrated the arrangement of a mattress filler making machine embodying a selected form of my invention.

Figs. 1 and 2 are diagrammatic views in plan and side elevation respectively, of a machine for continuously forming a mattress filling supply strip or web.

Fig. 3 is a diagrammatic side elevation illustrating the formation of the filling material supply strip.

Referring now to the drawing, I have indicated diagrammatically in Figs. 1 and 2, a conveyor 25 which is adapted to have a web of mattress filler material formed or deposited thereon. The belt 25 is continuously propelled and supported in any approved manner and a plurality of so-called camel back, Garnett machine units 26—26 are provided, each serving to deposit a comparatively thin sheet or layer of cotton or other suitable mattress filling material on the said conveyor.

Camel back, Garnett machine units such as above mentioned are well known in the art and hence are not described or illustrated in detail herein. For present purposes, it is sufficient to say that each such unit embodies mechanism for forming a comparatively thin felted web of cotton or other filler material on a continuously propelled belt which has a discharge end which travels back and forth across the continuously moving conveyor belt 25, whereby a sort of zig-zag layer-built mattress filling supply strip is deposited and formed on the conveyor 25.

In the present instance, I prefer to group the units 26 in groups of three, as shown in Figs. 1 and 2, between which a chute 27 is located for supplying filling material to the conveyor on top of an initial treble layer of cotton or other material distributed on the conveyor belt by means of the first set of machine units 26. The chute 27 is connected to any suitable source of supply of filling material which descends through the chute and is deposited on the initial treble filler layer. As shown in Figs. 1 and 2, the three units 26 at the right hand side of the figures constitute the first set or series, and the three units at the left hand side of the figures constitute the second set or series, the chute 27 being interposed therebetween.

It will be readily understood that the arrangement shown is effective to form a composite strip of filling material on the conveyor 25, the make up of which strip is shown in Fig. 3. The first three machine distributing units 26 serve to form a bottom layer 28 of the desired material, this layer being in effect, a treble layer since it is formed by three independently formed layers of material deposited by the initial series of camel back distributing units. An intermediate layer 29 of suitable material is deposited on top of the bottom layer 28 by means of the chute 27, the thickness of this intermediate layer being adjusted to suit requirements, and a third or top layer 30 of filling material is deposited on top of the said intermediate layer 29. The top layer 30 is also formed of three independently formed layers of material deposited by the second set of three distributing units 26. The intermediate layer 29 may conveniently be formed of a different kind or quality of material than that of which the outer layers 28 and 30 are formed.

It will be understood that machines of the type above described operate continuously and that by arrangement shown, a continuous web of mattress filling material of composite construction is formed. The continuous web may be rolled for storage for use when desired, or it may be separated into mattress filling units and immediately inserted into a mattress cover by any suitable means; for instance, by the mechanism disclosed in my said copending application. Many economies and other advantages are obtained in the manufacture of mattress filler webs according to the above description, including continuity of operation, automatic and rapid production and uniformity in dimensions and weight throughout the finished product.

I am aware that changes may be made in the described form and construction of a mattress filler web making machine and process, while retaining the principles of my invention and without departing from the spirit thereof, the scope of which should be determined by reference to the following claim, which should be construed as broadly as possible consistent with the state of the art.

I claim as my invention:

Apparatus for forming a composite mattress filler web comprising the combination of a continuously propelled belt conveyor, a set of devices for forming independent, felted webs of mattress filling material, said devices being arranged so as to deposit said felted webs on said conveyor in superposed relation, thereby forming a multi-layer bottom web of felted material, a chute connected with a source of supply and arranged to deposit unfelted material on said multi-layer bottom web in the form of a layer as an incident to the travel of said conveyor, and another set of devices for forming independent, felted webs of mattress filling material, said devices also being arranged so as to deposit the felted webs formed thereby in superposed relation on top of said layer of unfelted material.

JOHN F. GAIL.